United States Patent [19]

Takahashi

[11] Patent Number: 5,080,742
[45] Date of Patent: Jan. 14, 1992

[54] PROCESS FOR MANUFACTURE OF ARTICLE HAVING EMBOSSED PLASTIC SHEET COVERING

[75] Inventor: Masami Takahashi, Kanagawa, Japan

[73] Assignee: Tama Kasei Co., Ltd., Kanagawa, Japan

[21] Appl. No.: 416,010

[22] Filed: Oct. 2, 1989

[30] Foreign Application Priority Data

Sep. 30, 1988 [JP] Japan ............................ 63-246829

[51] Int. Cl.⁵ .................... B32B 31/18; B32B 31/20
[52] U.S. Cl. .................... 156/212; 156/213; 156/216; 156/245; 156/267; 156/285; 156/382
[58] Field of Search ............. 156/212, 213, 216, 242, 156/285, 382, 245, 267; 264/266, 271.1, 511; 425/503, 504, 521, DIG. 60

[56] References Cited

U.S. PATENT DOCUMENTS 2,590,221  3/1952  Stevens .................... 425/521 X

Primary Examiner—Michael W. Ball
Assistant Examiner—Michele K. Yoder
Attorney, Agent, or Firm—McAulay Fisher Nissen Goldberg & Kiel

[57] ABSTRACT

An improvement in a process for manufacture of an article comprising a core body covered with an embossed flexible plastic sheet employing an apparatus which comprises a male mold having a protruded portion and a female mold comprising a vacuum chamber and a depressed portion arranged thereon is disclosed. The apparatus is characteristic in that an embossed porous bottom surface is provided in the depressed portion and passages of pressurized gas are arranged on the wall of the depressed portion. An edge or rim of a reverse surface of the core body is neatly covered with an embossed plastic sheet by means fo the passage of pressurized gas attached to the female mold in the process of the manufacture of the covered article.

4 Claims, 8 Drawing Sheets

PROCESS FOR MANUFACTURE OF ARTICLE HAVING EMBOSSED PLASTIC SHEET COVERING

BACKGROUND OF THE INVENTION

1. Field of the invention

This invention relates to a process for manufacture of an article having an embossed plastic sheet covering and an apparatus for suitably employable for performing said process.

2. Description of prior art

A composite material comprising a rigid core body and an embossed plastic sheet is employed in various industrial fields, such as interior parts of automobiles, furniture, decorated panel, and various decorative materials. The embossment is made to have an artificial design, a repeated pattern, a leather pattern and the like. Particularly, an embossed sheet having a leather feeling as well as leather pattern is widely employed.

The above-described composite material is generally prepared by covering a rigid core body such as a rigid plastic body, a foamed plastic body or a metal body with a flexible plastic sheet having an embossed surface. The coverage is generally given to one side of the body. However, in most cases, the coverage is extended to an edge or rim of other side (i.e, reverse side) of the core body. Such composite material is illustrated in FIGS. 1A and 1B in the attached drawings.

FIG. 1A is a perspective view of a typical composite material 1 comprising a plate core body 2 and an embossed plastic sheet coverage 2 which is viewed from the reverse side. FIG. 1B is a sectional view taken along X—X line of FIG. 1A.

The composite material 1 has been previously manufactured using an apparatus illustrated in FIG. 2A.

In FIG. 2A, the apparatus comprises a male mold 11 which is composed of a protruded portion 12 having a number of through-holes 13 and a vacuum chamber 14 having at its bottom an outlet of air 15 which is connected to a vacuum source (not shown). A space 16 is formed on the vacuum chamber 14 and around the protruded portion 12. In the manufacture of the composite material, a core body 2 having a number of through-holes 2d are placed on the top of the protruded portion 12 of the male mold 11. The core body 2 has an adhesive on its upper surface 2a and an edge (rim) 2b of its lower (reverse) surface. Above the core body 2, a heated flexible plastic sheet 3 having an embossed upper surface 3a and a lower surface 3b coated with an adhesive is kept by a set of clamps 17.

The heated flexible sheet 3 is then placed on the core body 2 by lowering the clamps 17 and further caused to adhere to the upper surface of the core body 2 by succtioning the vacuum chamber 14, as is shown in FIG. 2B. Sleeves of the plastic sheet 3 are pushed into the space 16 by means of a pushing plate (or rod) 18. By this operation, the sleeves of the plastic sheet are caused to adhere to the edges of the lower surface of the core body 2. Thus combined core body and plastic sheet is then released from the male mold 11 and the combined portion is recovered from the plastic sheet by cutting it at a line between its fixed portion and its free portion.

By the above process, a composite material in the form illustrated in FIGS. 1A and 1B is manufactured. However, it is frequently observed that the obtained composite material shows deformed face at its edge portion. In more detail, a sleeve 4 of the combined plastic sheet 3 which adheres to a side 2c and an edge of the reverse surface 2b of the core body 2 frequently has a decreased thickness. Further, an embossment 4a formed on a surface of the plastic sheet sleeve at the extended portion (i.e, the portion on the side face and the edge) frequently disappears. Furthermore, it is frequently observed that a front surface of the combined plastic sheet has plural concaved portions on the openings of the through-holes. The troubles such as decrease of thickness, disappearance of embossment, and formation of concaved portions on the embossed surface make quality and commercial value of the composite material low.

In order to manufacture a composite material free from the above-mentioned troublesome features, an improved process using an apparatus comprising a female mold in addition to the male mold was invented. The apparatus and a process using the apparatus are shown in FIGS. 3A and 3B.

In the process, a heated flexible plastic sheet 3 is placed within a depressed portion 5 of a female mold 21. The female mold 21 comprises a vacuum chamber 24 and the depressed portion 5 arranged thereon. The vacuum chamber 24 has an outlet 25 which is connected to a vacuum source (not shown). The depressed portion 5 comprises a porous bottom surface 22. The plastic sheet 3 has an adhesive on its upper side 3b. The plastic sheet 3 is pushed onto the porous bottom surface 22 of the depressed portion 5 by discharging an air from a space between the sheet and the bottom surface by operating the vacuum source. On the heated flexible plastic sheet 3, a core body 2 having a lower surface 2a, a upper surface 2b and a number of through-holes 2d is placed. Subsequently, a male mold 31 composed of a protruded portion 32 having a number of through-holes 33 and a vacuum chamber 34 having at its top an outlet of air 35 which is connected to a vacuum source (not shown) is placed on the core body 2. The vacuum chamber 34 of the male mold 21 is then made vacuum by operating the vacuum source, whereby an air present between the core body 2 and the bottom surface 22 of the depressed portion 5 of the female mold 21, around the side of the core body, and above the edge of the upper surface of the core body 2 is discharged through the through holes 33. By this procedure, the upper surface 3b of the plastic sheet 3 and the lower surface 2a of the core body 2 is combined by an adhesive and further the sleeve portion of the plastic sheet is caused to adhere to the side and upper edge of the core body. The male mold 31 which has the core body 2 covered with the plastic sheet 3 on the protruded portion 32 is released from the female mold 21. Subsequently, the flexible sheet 3 is cut at an inner area on the upper surface 2b of the core body 2 to separate the core body 2 covered with an embossed plastic sheet from the flexible sheet.

By the above process, a composite material in the form illustrated in FIGS. 1A and 1B is manufactured. The resulting composite material is almost free from the deformation of the plastic sheet. However, it is still frequently observed that a front surface of the combined plastic sheet has concaved portions on the openings of the through-holes. Further, only a small-sized portion of the plastic sheet can be caused to adhere to the edge of the reverse surface of the core body. In other words, the coverage at the edge portion of the core body is insufficiently short. The troubles such as the short coverage at the edge portion and the concaved portions formed on the embossed surface still make quality and commercial value of the composite material low.

Further known is a process employing a female mold and a manual operation. This process is described below by referring to FIGS. 4A and 4B.

In the process, a heated flexible plastic sheet 3 is placed within a depressed portion of a female mold 41. The female mold 21 comprises a vacuum chamber 44 and the depressed portion arranged thereon. The vacuum chamber 44 has an outlet 45 which is connected to a vacuum source (not shown). The depressed portion comprises a porous bottom surface 42. At the top of the female mold, eaves 43 (member inwardly protruded over the depressed portion) is arranged. The plastic sheet 3 is pushed onto the porous bottom surface 42 of the depressed portion by discharging an air from a space between the sheet and the bottom surface by operating the vacuum source. The plastic sheet is molded in a cup form and then cooled on the female mold. The molded sheet 3 is then released from the female mold, and unnecessary portion is cut off. In the molded piece of sheet is placed manually a core body 2 having an adhesive at its lower surface 2a to combine the molded piece 3 (covering material) and the core body 2. Thus, a composite material is prepared. This process is disadvantageous in that the manual operation is required. Further, it is not easy to combine the core body and the molded plastic sheet with satisfactory fitness.

SUMMARY OF THE INVENTION

It is an object of the present invention to provide an improved process for manufacturing an article having an embossed plastic sheet covering and an apparatus for manufacture of the covered article.

There is provided by the present invention a process for manufacturing an article comprising a core body covered with an embossed plastic sheet which comprises the steps of:

placing a heated flexible plastic sheet over a depressed portion of a female mold comprising a vacuum chamber and the depressed portion arranged thereon, said depressed portion comprising an embossed porous bottom surface, its side wall, and passages of pressurized gas arranged on the wall;

placing a core body temporarily fixed onto a protruded portion of a male mold on the heated flexible plastic sheet and pushing down the flexible sheet into the depressed portion of the female mold to reach the bottom of the depressed portion so that the core body and the plastic sheet is combined to each other via an adhesive at each facing area, said adhesive having been provided on the core body or the flexible sheet;

discharging an air from a space between the porous bottom surface of the depressed portion of the female mold and the flexible sheet by means of the vacuum chamber of the female mold to press the flexible sheet onto the embossed porous bottom surface of the depressed portion of the female mold so that an embossed pattern is formed on a surface of the flexible plastic sheet wherein the embossed pattern is a reverse pattern of the embossed porous bottom surface of the female mold;

introducing a pressurized gas into the depressed portion of the female mold to push the flexible sheet inward to adhere to an edge of an upper surface of the core body by an adhesive;

releasing the male mold which has the core body covered with the flexible sheet on the protruded portion from the female mold; and cutting the flexible sheet at an inner portion on the upper surface of the core body to separate the core body covered with an embossed plastic sheet from the flexible sheet.

The present invention further provides a process for manufacturing an article comprising a core body covered with an embossed plastic sheet which comprises the steps of:

placing a heated flexible plastic sheet within a depressed portion of a female mold comprising a vacuum chamber and the depressed portion arranged thereon, said depressed portion comprising an embossed porous bottom surface, its side wall, and passages of pressurized gas arranged on the wall, by discharging an air from an space between the flexible sheet and the depressed portion by means of the vacuum chamber;

placing a core body temporarily fixed onto a protruded portion of a male mold on the heated flexible plastic sheet received in the depressed portion of the female mold under pressure to form an embossed pattern on a surface of the flexible plastic sheet wherein the embossed pattern is formed on a side facing the embossed bottom surface of the female mold in the form of a reverse pattern of the embossed porous bottom surface and to combine the core body and the plastic sheet via an adhesive at each facing area, said adhesive having been provided on the core body or the flexible sheet;

introducing a pressurized gas into the depressed portion of the female mold to push the flexible sheet inward to adhere to an edge of an upper surface of the core body by an adhesive;

releasing the male mold which has the core body covered with the flexible sheet on the protruded portion from the female mold; and cutting the flexible sheet at an inner portion on the upper surface of the core body to separate the core body covered with an embossed plastic sheet from the flexible sheet.

Furthermore, the invention provides an apparatus for manufacturing an article comprising a core body covered with an embossed plastic sheet which comprises a male mold comprising a protruded portion and a female mold comprising a vacuum chamber and the depressed portion arranged thereon, said depressed portion comprising an embossed porous bottom surface, its side wall, and passages of pressurized gas arranged on the wall.

DETAILED DESCRIPTION OF THE INVENTION

The process for manufacturing an article comprising a core body covered with an embossed plastic sheet according to the present invention can be classified into two typical embodiments, that is, a process utilizing a procedure of "plug assist forming" and a process utilizing a procedure of "straight forming".

Figure 1A:
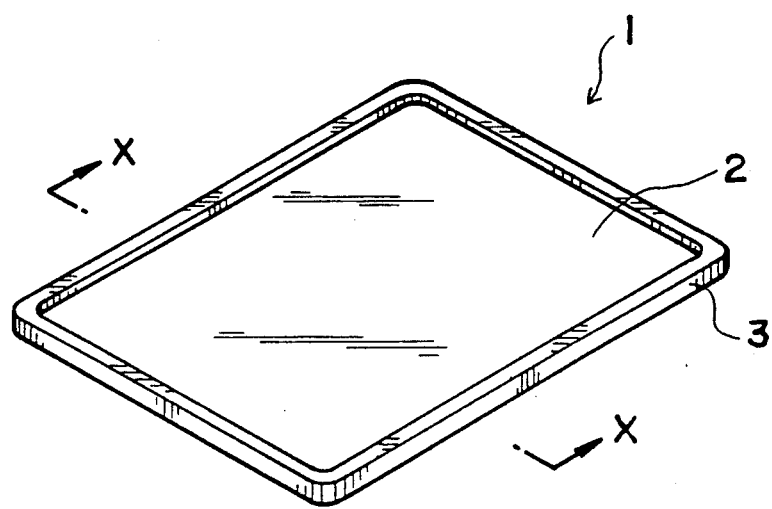
FIG. 1A is a perspective view of a reverse side of an article comprising a core body covered with an embossed plastic sheet.
Figure 1B:
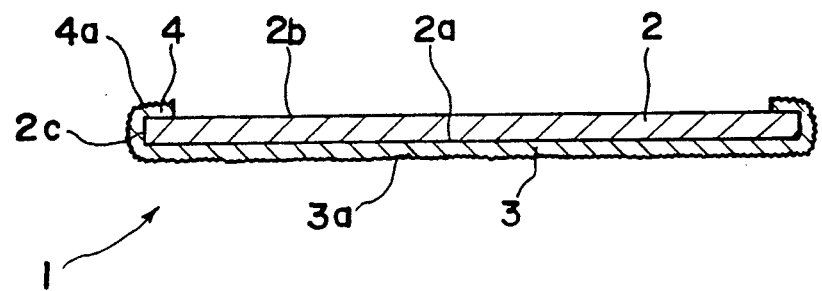
FIG. 1B is a sectional view of the article of FIG. 1A taken along line X—X.
Figure 2A:
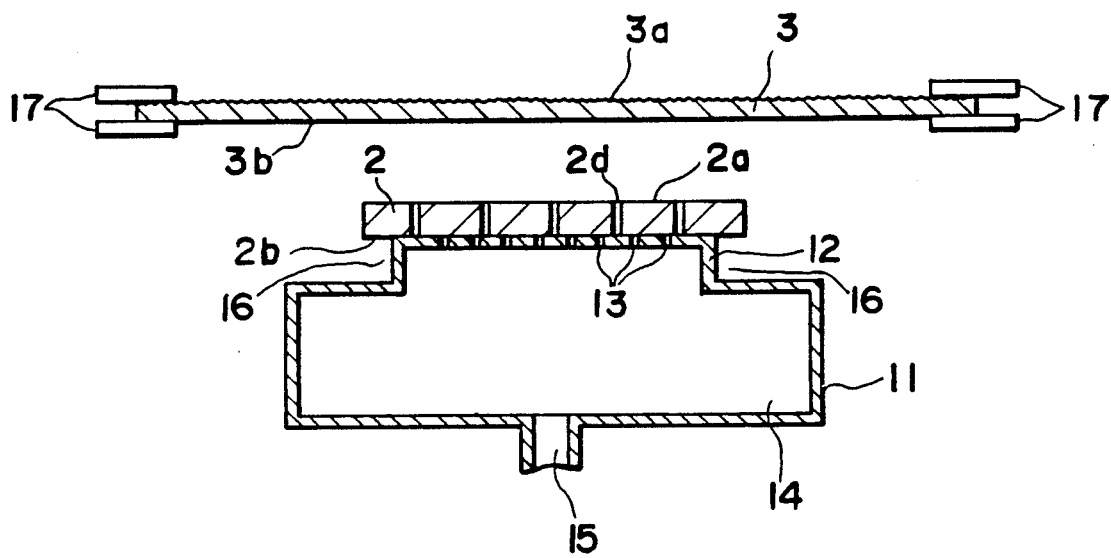
FIGS. 2A and 2B show, in combination, a known process and apparatus for manufacturing the article comprising a core body covered with an embossed plastic sheet which is illustrated in FIGS. 1A and 1B.
Figure 2B:
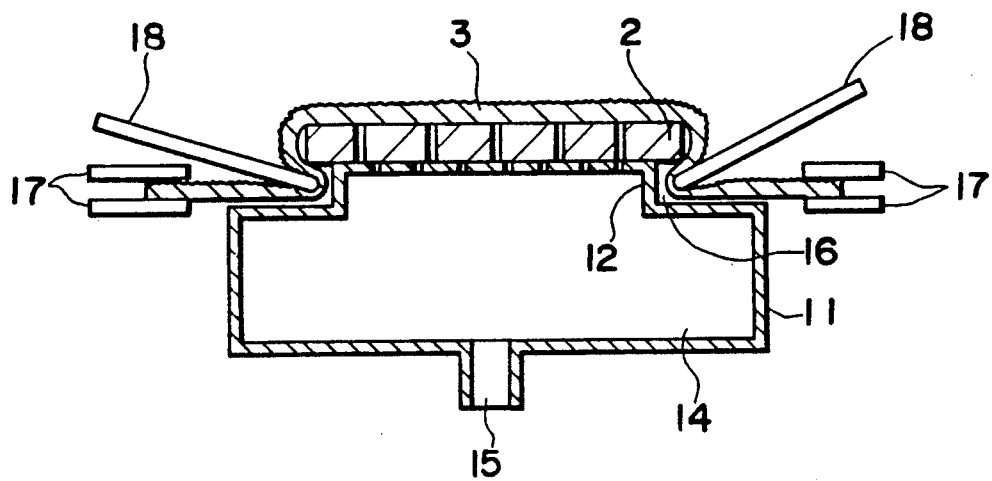
Figure 3A:
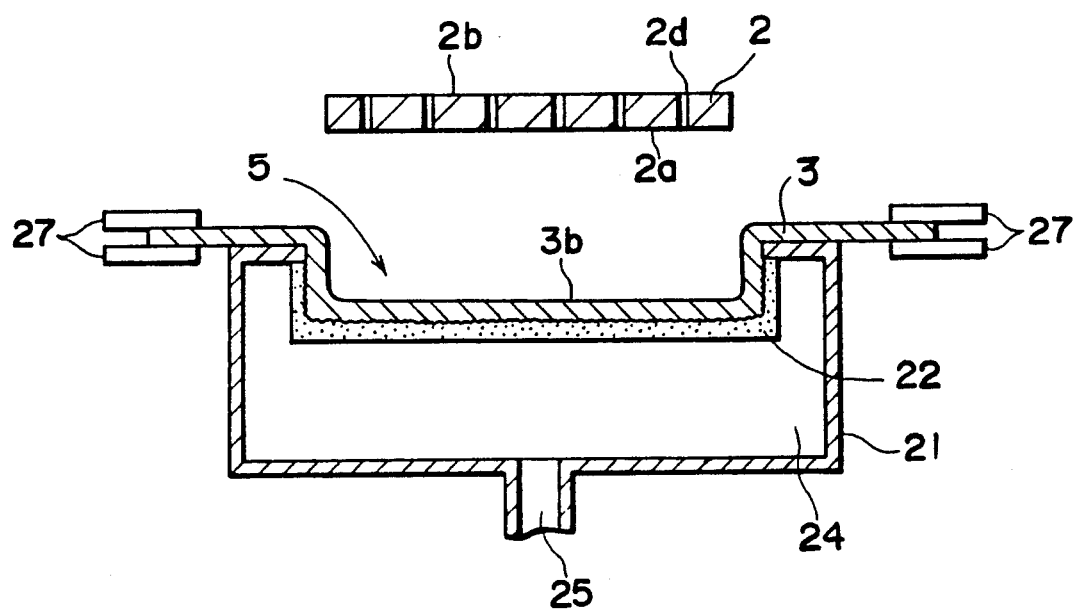
FIGS. 3A and 3B show, in combination, a known process and apparatus for manufacturing the article comprising a core body covered with an embossed plastic sheet of FIGS. 1A and 1B.
Figure 3B:
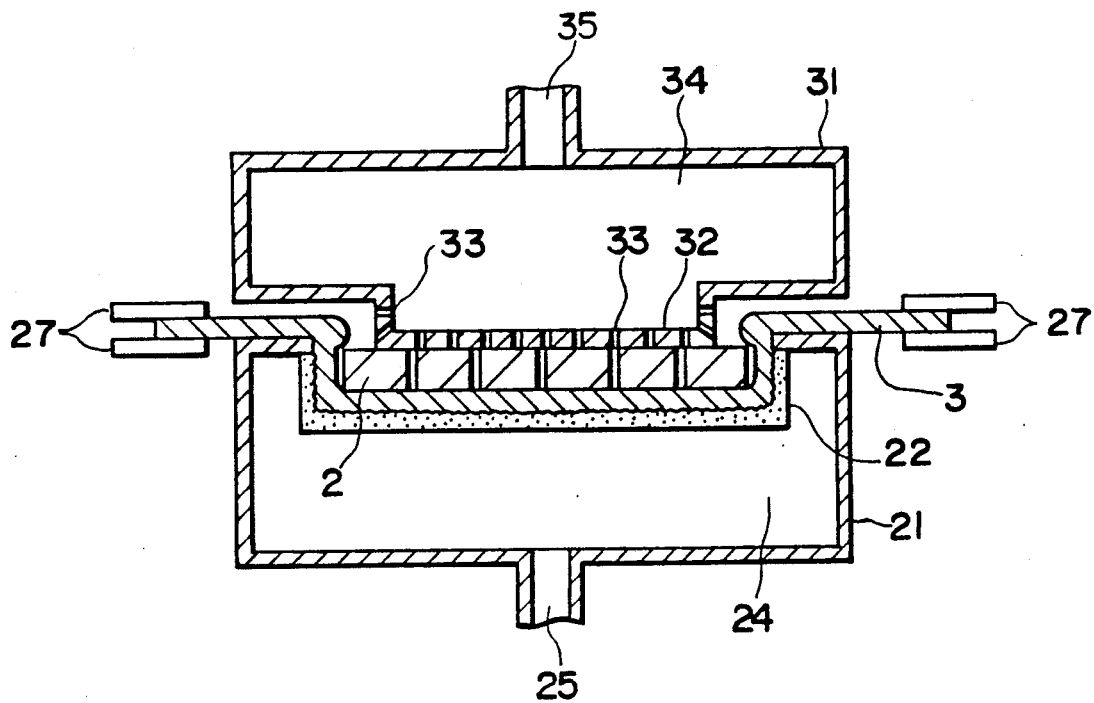
Figure 4A:
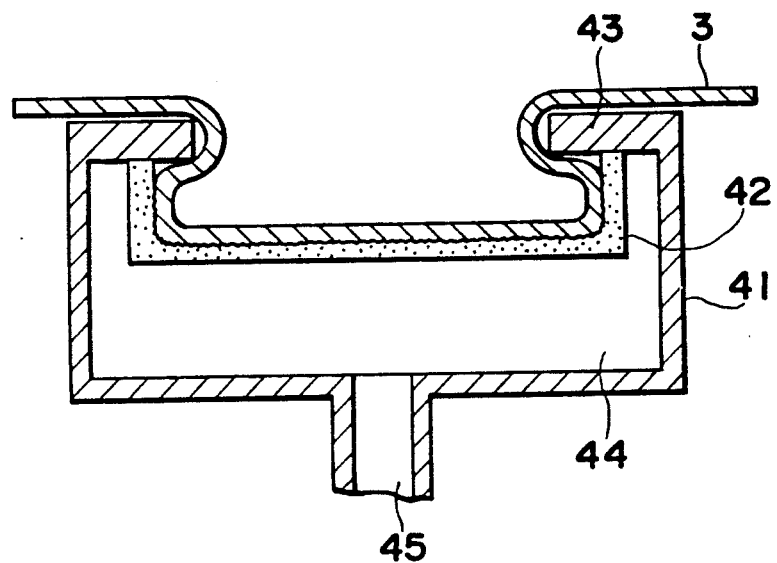
FIGS. 4A and 4B show, in combination, a known process and apparatus for manufacturing the article comprising a core body covered with an embossed plastic sheet of FIGS. 1A and 1B.
Figure 4B:
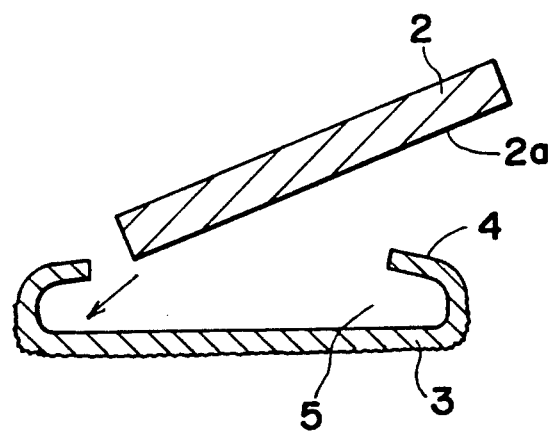
Figure 5A:
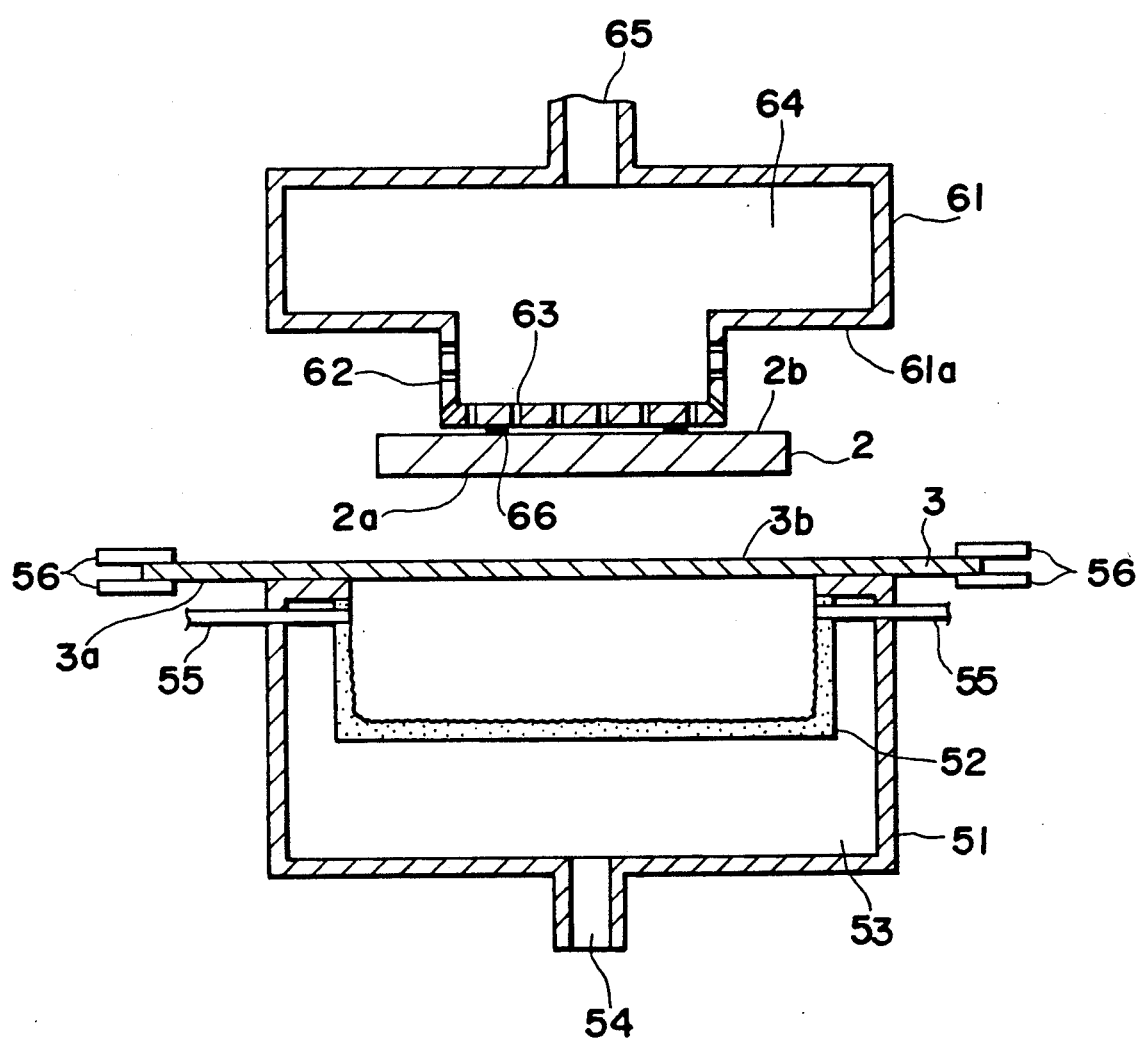
FIGS. 5A, 5B and 5C show, in combination, a process and apparatus of the invention for manufacturing the article comprising a core body covered with an embossed plastic sheet which is illustrated in FIGS. 1A and 1B.
Figure 5B:
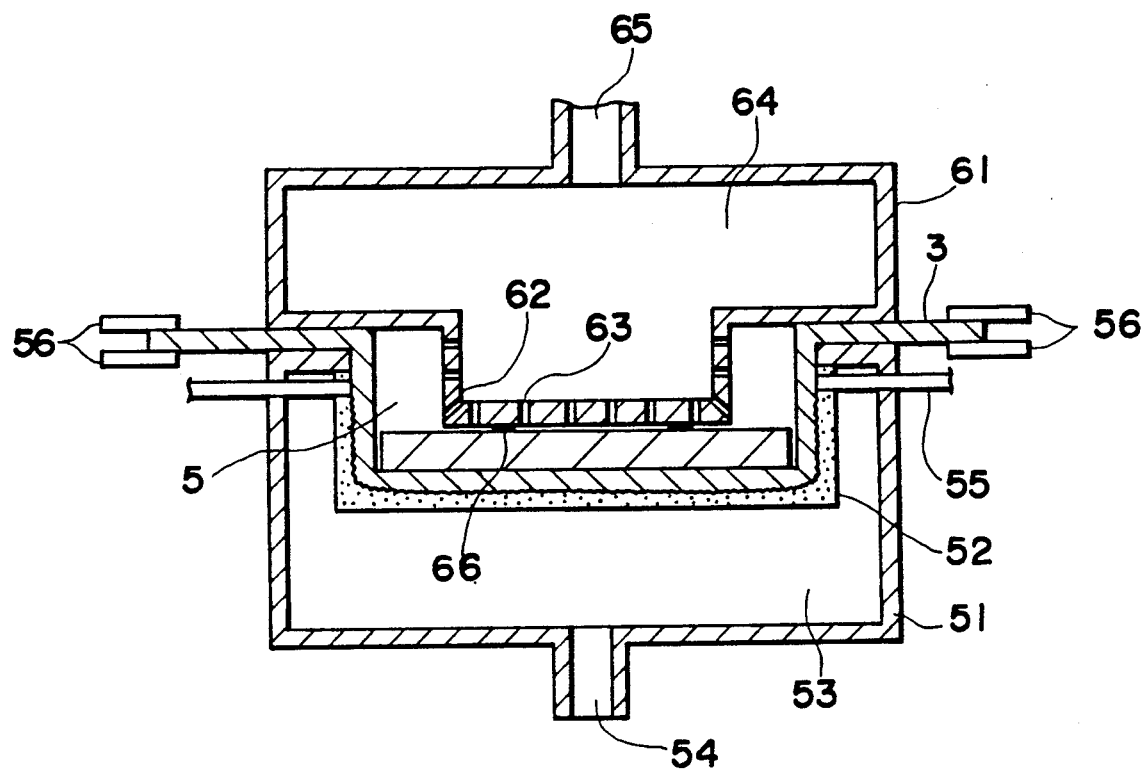
Figure 5C:
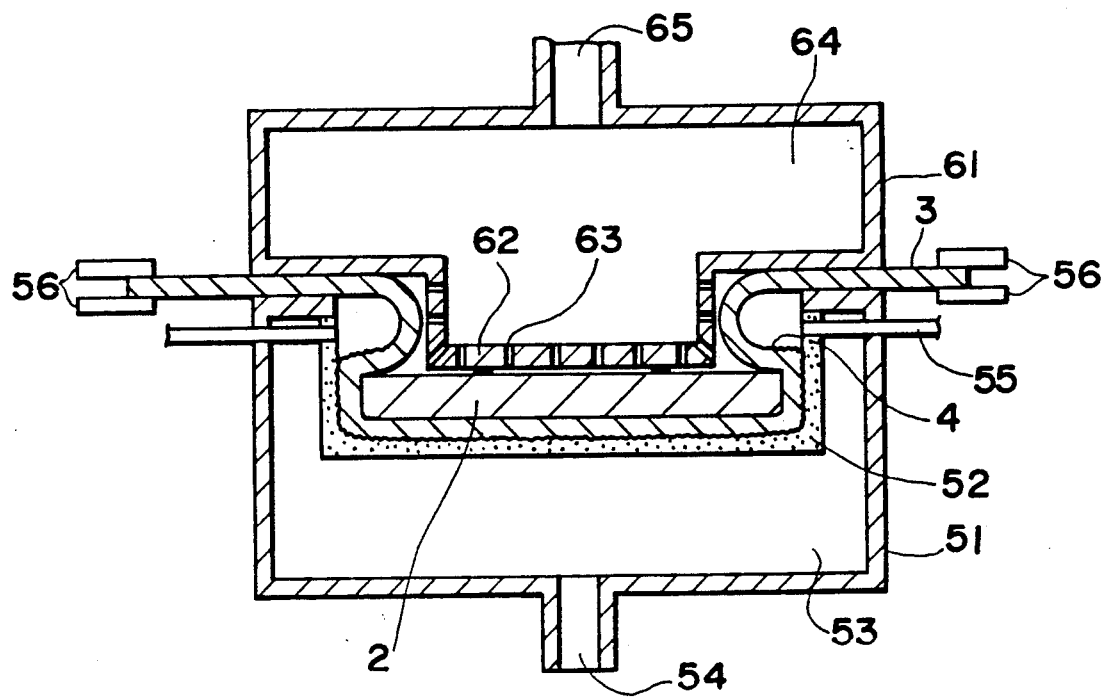

In the first place, a process utilizing the plug assist forming is described by referring to FIGS. 5A, 5B and 5C.

The process utilizes an apparatus a male mold 61 comprising a protruded portion 62 and a female mold 51 comprising a vacuum chamber 53 and the depressed portion 5 arranged thereon. The depressed portion of the female mold 51 comprises an embossed porous bottom surface 52, its side wall, and passages 55 of pressurized gas which are arranged on the wall for introducing a pressurized gas into the depressed portion 5. The embossed porous bottom surface of the female mold can be prepared by the steps of forming a sheet of an uncured mixture of a liquid thermoplastic resin such as epoxy resin or phenol resin and particles of inorganic or organic material such as iron powder, aluminum powder or ceramic powder on a temporary support, placing a material having a desired embossment (such as leather) on the uncured sheet to form a reverse pattern of the embossment of the material on the uncured sheet, curing the uncured sheet, and then removing the material from the cured sheet which now has the reverse pattern of the embossment on the surface. The porous structure is formed in the cured sheet in the course of the curing by shrinkage of the thermoplastic resin. Thus produced porous sheet having the embossed surface can be used alone or in combination with other porous material supporting the embossed porous sheet.

The male mold 61 preferably has a vacuum chamber 64 having a protruded portion 62 which has a number of through-holes 63 and an outlet 65 which is connected to a vacuum source (now shown).

In the first step, a heated flexible plastic sheet 3 is held at its ends by a holding means 56 and placed over the depressed portion of the female mold 51. The plastic sheet can be a sheet of thermoplastic material such as vinyl chloride resin, polyamide resin, polyethylene resin, polypropylene resin, polyurethane resin, diene rubber, or thermoelastomer. The plastic sheet can be composed of a plastic resin sheet and other material such as a woven sheet, a knitted sheet, or a nonwoven sheet. Otherwise, a flexible sheet of a woven, nonwoven or knitted sheet impregnated with a thermoplastic resin can be employed. Heating of the flexible plastic sheet can be made before the sheet is placed on the depressed portion. Otherwise, a plastic sheet can be heated on the depressed portion by means of an infrared lamp or other heat source.

On the heated plastic sheet 3 is then placed a core body 2 which is temporarily fixed onto the protruded portion 62 via a holding means 66 such as a plural number of suckers ale mold 61. The male mold 61 is pushed down into the depressed portion of the female mold to reach the embossed porous bottom 52 of the depressed portion. The core body 2 and the plastic sheet 3 is combined to each other via an adhesive at each facing area. The adhesive can be provided on the core body 2 at its lower surface 2a, its side and an edge portion of the upper surface and/or the flexible sheet 3 at the upper surface 3b. Subsequently, an air is discharged from a space between the porous bottom surface 52 of the depressed portion 5 of the female mold 51 and the flexible sheet 3 by suctioning the vacuum chamber 53 of the female mold 51 to press the flexible sheet 3 onto the embossed porous bottom surface. By this action, an embossed pattern which is a reverse pattern of the embossment of the embossed porous bottom surface is formed on the surface of the flexible plastic sheet 3.

Subsequently, as shown in FIG. 5C, a pressurized gas is introduced into the depressed portion 5 of the female mold 51 to push the embossed flexible sheet 3 inward to adhere to an edge of an upper surface of the core body 2 by the adhesive. At this stage, an air between the flexible sheet 3 and the protruded portion 62 of the male mold 61 is preferably discharged through the through-holes 63 by means of the vacuum chamber 64.

The male mold 61 is then lifted together with the core body 2 covered with the embossed flexible sheet 3 and released from the depressed portion 5 of the female mold 51. The embossed flexible sheet is cut at an inner portion on the upper surface of the core body to separate the core body covered with an embossed plastic sheet from the flexible sheet.

Thus, the desired article comprising a core body with an embossed plastic sheet is obtained. Because the process does not use a pushing means (plate or rod) to cause the embossed plastic sheet adhere to the side and edge of the core body, the obtained article is almost free from the troublesome deformation of the sheet at the edge portion. Further, since there is no need of using a core body having through-holes, no concave portions are formed on the surface of the embossed covering sheet of the article.

Figure 6A:
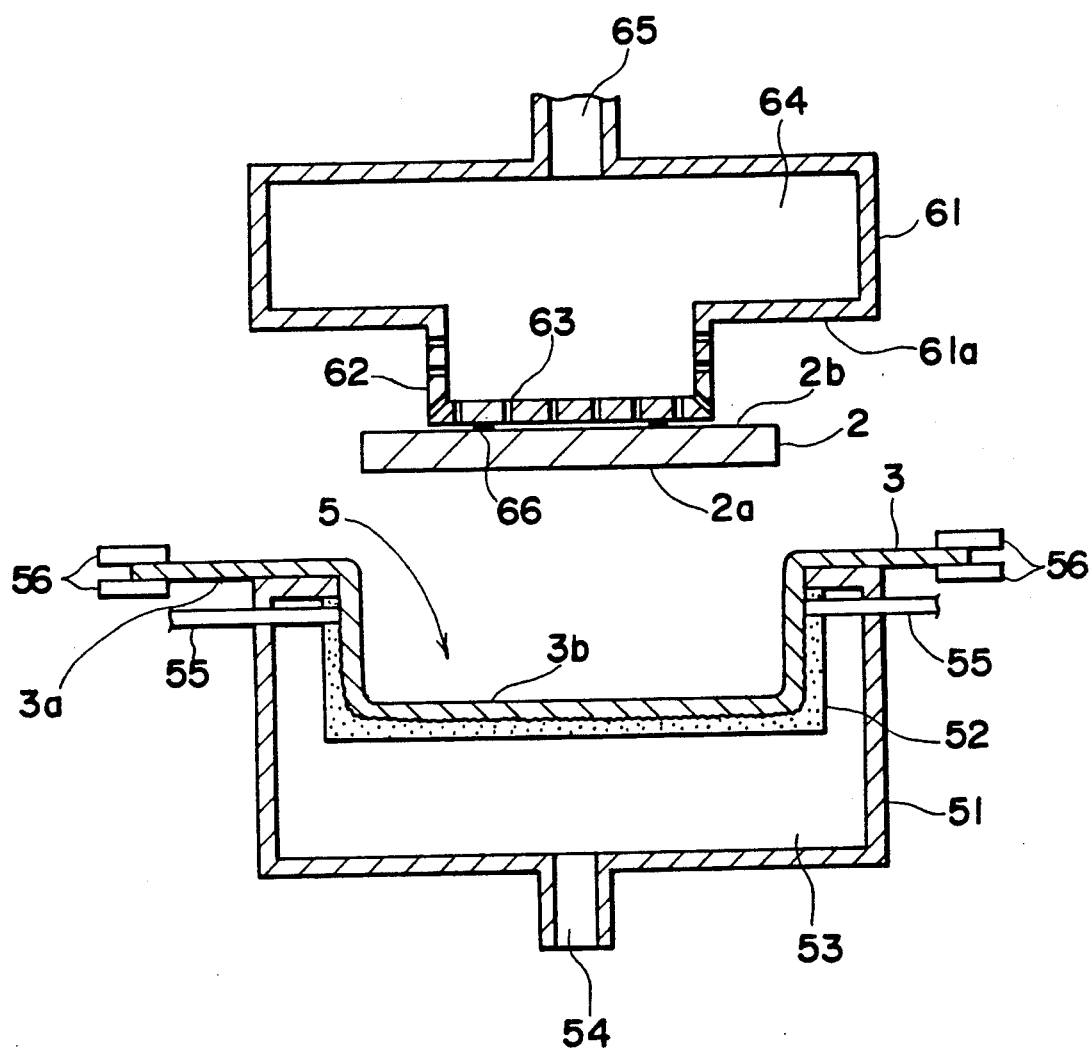
FIGS. 6A and 6C show, in combination, a process and apparatus of the invention for manufacturing the article comprising a core body covered with an embossed plastic sheet of FIGS. 1A and 1B.

In the second place, another process utilizing the straight forming is described by referring to FIGS. 6A and 6C. This process can be performed utilizing the same apparatus as shown in FIG. 5A.

Initially, a heated flexible plastic sheet 3 is placed within a depressed portion 5 of a female mold 51 by discharging an air from an space between the flexible sheet 3 and the depressed portion 5 by means of the vacuum chamber 53.

A core body 2 temporarily fixed onto a protruded portion 62 of a male mold 61 is placed on the heated flexible plastic sheet 3 received in the depressed portion 5 of the female mold 51 under pressure to form an embossed pattern on a surface of the flexible plastic sheet 3. The embossed pattern formed on the surface of the flexible sheet 3 is the same reverse pattern as described hereinbefore.

Figure 6B:
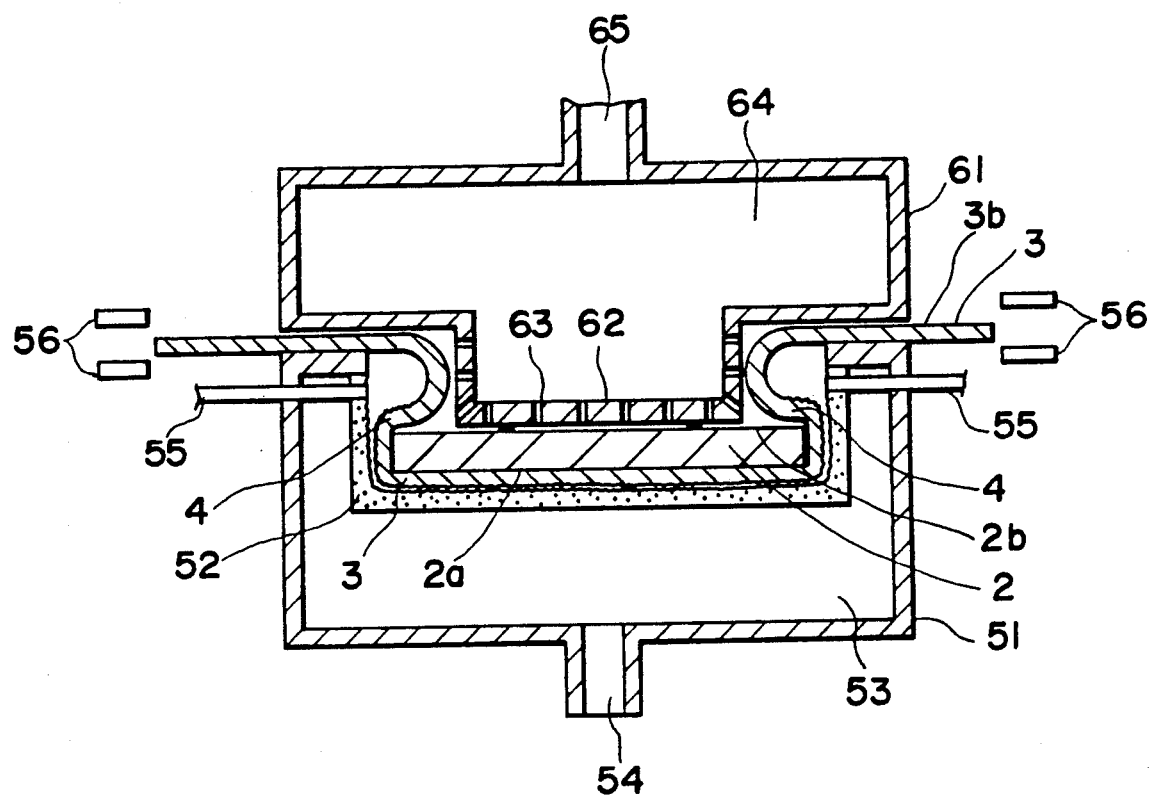

Subsequently, as shown in FIG. 6B, a pressurized gas is introduced into the depressed portion 5 of the female mold 51 to push the embossed flexible sheet 3 inward to adhere to an edge of an upper surface of the core body 2 by the adhesive. At this stage, an air between the flexible sheet 3 and the protruded portion 62 of the male mold 61 is preferably discharged through the throughholes 63 by means of the vacuum chamber 64.

The male mold 61 is then lifted together with the core body 2 covered with the embossed flexible sheet 3 and released from the depressed portion 5 of the female mold 51. The embossed flexible sheet is cut at an inner portion on the upper surface of the core body to separate the core body covered with an embossed plastic sheet from the flexible sheet.

Thus, the desired article comprising a core body with an embossed plastic sheet is obtained. Because the process does not use a pushing member to cause the embossed plastic sheet adhere to the side and edge of the core body, the obtained article is also almost free from the troublesome deformation of the sheet at the edge portion. Further, since there is no need of using a core body having through-holes, no concave portions are formed on the surface of the embossed covering sheet of the article.

Figure 7:
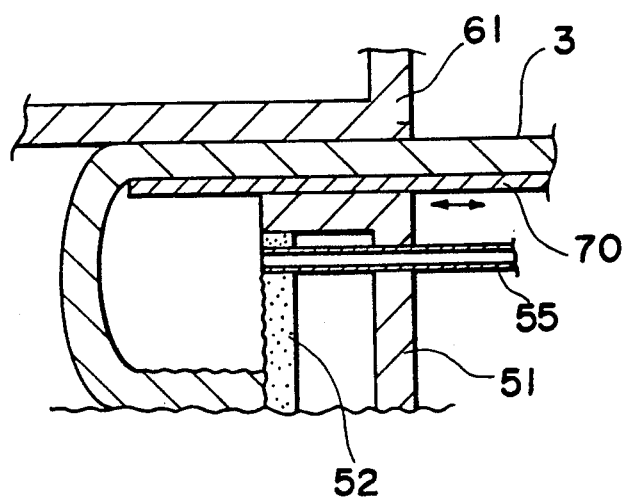
FIG. 7 shows a part of a female mold employable in a process and apparatus of the invention.

FIG. 7 shows a sliding means 70 which is used for assisting sliding movement of the flexible sheet 3 into the female mold. The use of such sliding means is advantageous to assist the adhesion of the plastic sheet to the edge portion of the upper surface of the core body.

I claim:

1. A process for manufacturing an article comprising a core body covered with an embossed plastic sheet which comprises the steps of:

placing a heated flexible plastic sheet over a depressed portion of a female mold comprising a vacuum chamber and the depressed portion arranged thereon, said depressed portion comprising an embossed porous bottom surface, a side wall, and passages for pressurized gas arranged on the wall;

placing a core body temporarily fixed onto a protruded portion of a male mold on the heated flexible plastic sheet and pushing down the flexible sheet into the depressed portion of the female mold to reach the bottom of the depressed portion so that the core body and the plastic sheet is combined to each other via an adhesive at each facing area, said adhesive having been provided on the core body or the flexible sheet;

discharging air from a space between the porous bottom surface of the depressed portion of the female mold and the flexible sheet by means of the vacuum chamber of the female mold to press the flexible sheet onto the embossed porous bottom surface of the depressed portion of the female mold so that an embossed pattern is formed on a surface of the flexible plastic sheet wherein the embossed pattern is a reverse pattern of the embossed porous bottom surface of the female mold;

introducing a pressurized gas into the depressed portion of the female mold to push the flexible sheet inward to adhere to an edge of an upper surface of the core body by the adhesive;

releasing the male mold which has the core body covered with the flexible sheet on the protruded portion from the female mold; and cutting the flexible sheet at an inner portion on the upper surface of the core body to separate the core body covered with an embossed plastic sheet from the flexible sheet.

2. The process as claimed in claim 1, wherein the male mold has a vacuum chamber, the protruded portion of the male mold has through-holes and the step of introducing a pressurized gas into the depressed portion of the female mold is performed under the condition that air within a space between the flexible sheet and the protruded portion of the male mold is discharged into the vacuum chamber of the male mold through the through-holes of the protruded portion.

3. A process for manufacturing an article comprising a core body covered with an embossed plastic sheet which comprises the steps of:

placing a heated flexible plastic sheet within a depressed portion of a female mold comprising a vacuum chamber and the depressed portion arranged thereon, said depressed portion comprising an embossed porous bottom surface, a side wall, and passages for pressurized gas arranged on the wall, by discharging air from a space between the flexible sheet and the depressed portion by means of the vacuum chamber;

placing a core body temporarily fixed onto a protruded portion of a male mold on the heated flexible plastic sheet received in the depressed portion of the female mold under pressure to form an embossed pattern on a surface of the flexible plastic sheet wherein the embossed pattern is formed on a side facing the embossed bottom surface of the female mold in the form of a reverse pattern of the embossed porous bottom surface and to combine the core body and the plastic sheet via an adhesive at each facing area, said adhesive having been provided on the core body or the flexible sheet;

introducing a pressurized gas into the depressed portion of the female mold to push the flexible sheet inward to adhere to an edge of an upper surface of the core body by the adhesive;

releasing the male mold which has the core body covered with the flexible sheet on the protruded portion from the female mold; and cutting the flexible sheet at an inner portion on the upper surface of the core body to separate the core body covered with an embossed plastic sheet from the flexible sheet.

4. The process as claimed in claim 3, wherein the male mold has a vacuum chamber, the protruded portion of the male mold has through-holes and the step of introducing a pressurized gas into the depressed portion of the female mold is performed under the condition that air within a space between the flexible sheet and the protruded portion of the male mold is suctioned out into the vacuum chamber of the male mold through the through-holes of the protruded portion.

* * * * *